United States Patent
Prasad et al.

(10) Patent No.: US 10,334,616 B2
(45) Date of Patent: Jun. 25, 2019

(54) ANALYSIS AND EVALUATION OF A PRACTICAL DOWNLINK MULTIUSER MIMO SCHEDULER OVER LTE ADVANCED MASSIVE MIMO SYSTEMS

(71) Applicants: NEC Laboratories America, Inc., Princeton, NJ (US); NEC Corporation, Tokyo (JP)

(72) Inventors: Narayan Prasad, Willow Grove, PA (US); Sampath Rangarajan, Bridgewater, NJ (US); Patricia Wells, Surrey (GB); Robert Arnott, Surrey (GB)

(73) Assignee: NEC Corporation (JP)

( * ) Notice: Subject to any disclaimer, the term of this patent is extended or adjusted under 35 U.S.C. 154(b) by 31 days.

(21) Appl. No.: 15/583,247

(22) Filed: May 1, 2017

(65) Prior Publication Data
US 2017/0318601 A1    Nov. 2, 2017

Related U.S. Application Data

(60) Provisional application No. 62/329,411, filed on Apr. 29, 2016.

(51) Int. Cl.
*H04L 12/26* (2006.01)
*H04W 72/12* (2009.01)
(Continued)

(52) U.S. Cl.
CPC ....... *H04W 72/1247* (2013.01); *H04L 1/1893* (2013.01); *H04L 5/0026* (2013.01);
(Continued)

(58) Field of Classification Search
USPC ............... 370/229, 230, 252, 328, 329, 330
See application file for complete search history.

(56) References Cited

U.S. PATENT DOCUMENTS 9,001,769 B1* 4/2015 Park ...................... H04W 36/06
370/329
2013/0128760 A1* 5/2013 Fujishima .............. H04B 7/022
370/252
(Continued)

OTHER PUBLICATIONS

Dimic, et al., "On Downlink Beamforming With Greedy User Selection: Performance Analysis and a Simple New Algorithm", IEEE Transactions on Signal Processing, Oct. 2005, pp. 3857-3868, vol. 53, No. 10.
(Continued)

*Primary Examiner* — Kwang B Yao
*Assistant Examiner* — Nguyen H Ngo
(74) *Attorney, Agent, or Firm* — Joseph Kolodka (57) ABSTRACT

Methods and a system are provided for enhanced long-term evolution scheduling. A ranking is constructed for one or more users scheduled on one or more resource blocks. A layer mapping is generated, using a finite modulation and coding scheme, utilizing the ranking of each of the one or more users for the one or more resource blocks. An enhanced ranking is determined, using a finite constraint on a buffer for each of the one or more users, for the one or more resource blocks utilizing the layer mapping. The enhanced ranking is deployed into a schedule for the one or more resource blocks being utilized by each of the one or more users. Bandwidth usage is optimized in the one or more resource blocks by utilizing the schedule.

6 Claims, 5 Drawing Sheets

(51) Int. Cl.
*H04W 72/06* (2009.01)
*H04L 1/18* (2006.01)
*H04L 5/00* (2006.01)
*H04W 28/02* (2009.01)
*H04B 7/0452* (2017.01)

(52) U.S. Cl.
CPC ......... *H04W 72/06* (2013.01); *H04W 72/121* (2013.01); *H04W 72/1231* (2013.01); *H04W 72/1273* (2013.01); *H04B 7/0452* (2013.01); *H04W 28/0215* (2013.01)

(56) References Cited

U.S. PATENT DOCUMENTS

| | | | |
|---|---|---|---|
| 2013/0223294 A1* | 8/2013 | Karjalainen | H04L 5/14 370/277 |
| 2013/0229996 A1* | 9/2013 | Wang | H04W 72/0413 370/329 |
| 2014/0064392 A1* | 3/2014 | Jonsson | H04L 1/0026 375/267 |
| 2014/0126551 A1* | 5/2014 | Nammi | H04L 1/0025 370/336 |
| 2015/0043341 A1* | 2/2015 | Wong | H04L 5/0023 370/230 |
| 2015/0211767 A1* | 7/2015 | Lin | F24S 20/30 126/609 |
| 2016/0150518 A1* | 5/2016 | He | H04L 1/1887 370/329 |
| 2016/0262167 A1* | 9/2016 | Lan | H04L 5/0057 |
| 2018/0027527 A1* | 1/2018 | Vitthaladevuni | H04B 7/0413 |

OTHER PUBLICATIONS

Hosseini, et al., "Optimizing Large-Scale MIMO Cellular Downlink: Multiplexing, Diversity, or Interference Nulling?", Fifty-third Annual Allerton Conference Allerton House, UIUC, Sep. 2015, pp. 266-270.

Wang et al., "User Selection With Zero-Forcing Beamforming Achieves the Asymptotically Optimal Sum Rate", IEEE Transactions on Signal Processing, Aug. 2008, pp. 3713-3726, vol. 56, No. 8.

Zois, et al, "Non-Asymptotic Performance Bounds for Downlink MU-MIMO Scheduling", 12th Annual Conference on, Wireless On-demand Network Systems and Services (WONS), Jan. 2016, 8 pages.

Ravindran, et al., "Limited Feedback-Based Block Diagonalization for the MIMO Broadcast Channel", IEEE Journal on Selected Areas in Communications, Oct. 2008, pp. 1473-1482, vol. 26, No. 8.

Shen et al., "SIEVE: Scalable User Grouping for Large MU-MIMO Systems", 2015 IEEE Conference on Computer Communications (INFOCOM), Apr. 2015, pp. 1975-1983.

Yoo et al., "On the Optimality of Multiantenna Broadcast Scheduling Using Zero-Forcing Beamforming", IEEE Journal on Selected Areas in Communications, Mar. 2006, pp. 528-541, vol. 24, No. 3.

Yue, et al., "Downlink Multiuser MIMO Scheduling in LTE Advanced Systems", IEEE ICC 2012—Wireless Communications Symposium, Jun. 2012, pp. 4484-4488.

* cited by examiner

ANALYSIS AND EVALUATION OF A PRACTICAL DOWNLINK MULTIUSER MIMO SCHEDULER OVER LTE ADVANCED MASSIVE MIMO SYSTEMS

RELATED APPLICATION INFORMATION

This application claims priority to U.S. Provisional Patent Application Ser. No. 62/329,411 filed on Apr. 29, 2016, incorporated herein by reference in its entirety.

BACKGROUND

Technical Field

The present invention generally relates to long-term evolution (LTE) systems and more particularly to a practical downlink (DL) multiuser multi-input-multi-output (MU-MIMO) scheduler over LTE advanced massive MIMO systems.

Description of the Related Art

The MU-MIMO narrowband user selection problem has been analyzed mainly for the case when each user has one receive antenna and can be assigned one stream. In general, there is a coupling constraint in that a user that is selected on multiple resource blocks (RBs) must be assigned the same transmit rank on all those RBs, a.k.a. per-user rank constraint. The DL wideband MU-MIMO scheduling problem with the aforementioned per-user rank-constraint has been only considered for specific values of the input parameters (such as the maximum number of co-scheduled users, maximum rank per user etc.). Moreover, none of the prior algorithms incorporate the decorrelation property of massive MIMO systems.

The theoretical limits for a broadcast channel under ideal conditions and established the huge promise of MU-MIMO. This spurred investigations that have been ongoing for the past decade. Most of these investigations have focused their attention on more practical yet asymptotically optimal linear transmit precoding and have also considered the impact of imperfect channel state information (CSI). The effort to standardize DL MU-MIMO has led to the adoption of precoded pilots in LTE-A. These precoded pilots enable a scheduled user to directly estimate the effective channel (which is the product of the DL channel matrix and the transmit precoder). Thus, the base station (BS) is freed from the burden of explicitly conveying the chosen precoder to the scheduled users and hence can fully optimize its choice of the precoding matrix. However, the performance results of MU-MIMO in frequency-division duplexing (FDD) systems equipped with a modest number of transmit antennas (typically 2 or 4) have not lived up to the expectations. This is because obtaining CSI feedback that is accurate enough for MU-MIMO has proved to be challenging given the feedback constraints placed in LTE. Moreover, the small number of transmit antennas that comprise of cross-polarized antenna element pairs are useful for single-user (SU) MIMO but are not conducive to creating beams that enable good separation of different users in the signal space.

SUMMARY

According to an aspect of the present principles, a computer-implemented method is provided for enhanced scheduling on a long-term evolution network. The method includes constructing, by a processor, a ranking for one or more users scheduled on one or more resource blocks. The method also includes generating, by the processor using a finite modulation and coding scheme, a layer mapping utilizing the ranking of each of the one or more users for the one or more resource blocks. The method additionally includes determining, by the processor using a finite constraint on a buffer for each of the one or more users, an enhanced ranking for the one or more resource blocks utilizing the layer mapping. The method further includes deploying, by the processor, the enhanced ranking into a schedule for the one or more resource blocks being utilized by each of the one or more users. The method also includes optimizing, by the processor, bandwidth usage in the one or more resource blocks by utilizing the schedule.

According to another aspect of the present principles, a computer-implemented method is provided for enhanced scheduling on a long-term evolution network. The method includes constructing, by a processor, a ranking for one or more users scheduled for an initial transmission on one or more resource blocks. The method also includes generating, by a processor, an enhanced ranking by applying a hybrid automatic repeat request process that maintains the ranking constructed for the initial transmission in the enhanced ranking for each of the one or more users for which a re-transmission is to be performed, and permits modification of the ranking constructed in the initial transmission for each of the one or more users lacking the retransmission. The method additionally includes deploying, by the processor, the enhanced ranking into a schedule for the one or more resource blocks being utilized by each of the one or more users. The method further includes optimizing, by the processor, bandwidth usage in the one or more resource blocks by utilizing the schedule.

According to yet another aspect of the present principles, a system is provided for enhanced long-term evolution scheduling. The system includes a processor and a memory. The processor and the memory are configured to construct a ranking for one or more users scheduled on one or more resource blocks by assigning a precoder to each of the one or more users. The processor and the memory are further configured to generate an enhanced ranking that reduces a number of precoder computations on the one or more resource blocks, by only initiating a precoder computation when a precoder computation criterion is met. The processor and the memory are additionally configured to deploy the enhanced ranking into a schedule for the one or more resource blocks being utilized by each of the one or more users. The processor and the memory are also configured to optimize bandwidth usage in the one or more resource blocks by utilizing the schedule.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The invention improves the DL MU-MIMO scheduler for LTE advanced massive MIMO systems. Different embodiments can be used singly or in combination together. Several useful embodiments include: (i) processing the output to enforce finite modulation and coding scheme (MCS) and finite buffer constraints; (ii) incorporating hybrid automatic repeat request (HARQ) and (iii) including complexity reduction features that also exploit the decorrelating property of massive MIMO systems.

An embodiment considers the DL wideband MU-MIMO scheduling problem in each cell of an LTE-A network, where a scheduling decision must be determined every sub-frame. This involves selecting users on each narrowband resource block (RB), where a selected user can be assigned more than one stream (a.k.a. a transmit rank greater than 1). However, there is a coupling constraint in that a user that is selected on multiple RBs must be assigned the same transmit rank on all those RBs. It is noted that the flexibility of allowing multiple streams per user is important especially in practical massive MIMO scenarios where each active user has multiple receive antennas and the number of such users is not large compared to the number of transmit antennas at the BS. Moreover, as the number of antennas increase the channel vectors corresponding to different users become increasingly decorrelated. The DL narrowband user selection has been analyzed mainly for the case when each user has one receive antenna and hence can be assigned one stream. Unfortunately, this is intractable and has been shown to be even hard to approximate. Consequently, several heuristics are proposed. The DL wideband MU-MIMO scheduling with the aforementioned per-user rank-constraint has been only considered for specific values of the input parameters (such as the maximum number of co-scheduled users, maximum rank per user etc.).

One embodiment significantly enhances the basic rank-balancing algorithm. It shows that the resulting algorithm achieves a meaningful approximation guarantee for the general wideband LTE-A DL MU-MIMO scheduling problem, that scales as $$\frac{1}{l^{MU}\log l},$$

where l is the maximum number of streams that can be assigned to any user and $l^{MU}$ denotes the maximum number of users that can be scheduled on any RB.

This embodiment conducts a thorough system level evaluation of the algorithm by emulating an LTE-A massive MIMO network. The emulated network is comprised of multiple cells operating in a standalone fashion and each cell is served by a BS equipped with a large antenna array. It is noted that using stochastic geometry tools have demonstrated the relative advantages of standalone operation over one that entails cooperation.

This embodiment demonstrates the gains that can be achieved over a baseline system in which each cell is served by a 2 transmit antenna BS. These gains are obtained for several different antenna array sizes and inter-site-distances (ISDs).

Another embodiment considers a wideband DL MU-MIMO cell with $M_t$ transmit antennas at the base station (BS) and $M_r$ receive antennas at each user k, where $M_t \geq M_r$. It is assumed K active users in the cell of interest and a total of N RBs (in each scheduling interval) available for data transmission. The signal received by the kth user on the nth RB is modeled as $$y_{k,n}=H_{k,n}x_n+\eta_{k,n}, k=1,\ldots,K, n=1,\ldots,N, \quad (1)$$

where $H_{k,n} \in \mathbb{C}^{M_r \times M_t}$ is the channel matrix and $\eta_{k,n} \sim \mathbb{C}^{M_r \times M_t}$ is the additive noise plus inter-cell-interference (ICI). Notice that without loss of generality it is assumed a noise-plus-ICI whitening operation at the user so that the channel matrix given in (1) is obtained post-whitening. The signal vector $x_n$ transmitted by the BS on the nth RB can be expanded as $x_n=\sum_{k \in U^{(n)}} V_{k,n} s_{k,n}$, where $U^{(n)}$ is the set of users co-scheduled (grouped) on the nth RB. $V_{k,n}$, $k \in U^{(n)}$ is the $M_t \times r_k^{(n)}$ transmit precoding matrix used to transmit to the kth user on the nth RB and has $r_k^{(n)}$ unit-norm columns. Henceforth, $r_k^{(n)}$ is referred to as the rank assigned to user k on the nth RB. $s_{k,n}$ is the $r_k^{(n)} \times 1$ symbol vector intended for the kth user on the nth RB. Furthermore, let $S_n=\sum_{k \in U^{(n)}} r_k^{(n)}$ be the total number of co-scheduled streams on RB n. The total power for all streams in any RB is ρ. Both equal power allocation over all co-scheduled streams in each RB, as well equal power over all co-scheduled users are considered. In the former case the power for each stream of user $k \in U^{(n)}$ on the nth RB is given by $$\rho'_{k,n} = \frac{\rho}{S_n}.$$

On the other hand, under equal power per-user, the power for each stream of user $k \in U^{(n)}$ on the nth RB is given by $$\rho'_{k,n} = \frac{\rho}{|U^{(n)}|r_k^{(n)}}.$$

The transmit precoders are constructed using the available channel state information (CSI) (from which the channel estimates $\hat{H}_{k,n}$, $\forall k, n$ are obtained at the BS). It is assumed that the zero forcing (ZF) method is employed for constructing transmit precoders but note that the results apply to other precoding methods such as block diagonalization (BD). It is noted that ZF precoding is usually considered in a scenario where users have a single receive antenna each so that a single stream can be assigned to each scheduled user. Next, the convention is adopted for designing ZF precoders is described. Consider any RB n and any given user set $U^{(n)}$ along with a feasible rank vector $r^{(n)}=[r_1^{(n)},\ldots,r_K^{(n)}]$, such that $r_k^{(n)}=0$ for any user $k \notin U^{(n)}$ while $r_k^{(n)} \geq 1$ for any user $k \in U^{(n)}$. It is assumed that each user $k \in U^{(n)}$ that is assigned rank $r_k^{(n)}$ on RB n will receive data only post-filtering using a set of assigned $r_k^{(n)}$ left singular vectors of the channel estimate $\hat{H}_{k,n}$. To identify a particular set of $r_k^{(n)}$ vectors (also referred to here as modes) out of the available $M_r$ ones for each user, the binary valued $M_r \times K$ matrix $M^{(n)}$ is used. In particular, $M_{i,k}^{(n)}=1$ ($M_{i,k}^{(n)}=0$) denotes that the $i^{th}$ mode is (not) selected for user k on RB n. For any given such matrix $M^{(n)}$, it obtains the $r_k^{(n)} \times M_t$ matrix $\tilde{H}_{k,n} = \hat{U}_{k,n}^\dagger \hat{H}_{k,n}$, $\forall k \in U^{(n)}$, where $\hat{U}_{k,n}$ is the $M_r \times r_k^{(n)}$ filter matrix whose columns are the vectors identified by $M^{(n)}$ for user k. The construction of the transmit precoder proceeds by using the matrices $\{\tilde{H}_{k,n}\}_{k \in U^{(n)}}$ as follows. Let $\tilde{H}_n = ([\tilde{H}_{k,n}^\dagger]_{k \in U^{(n)}})^\dagger$ denote the $(\Sigma_{k \in U^{(n)}} r_k^{(n)}) \times M_t$ composite matrix. It obtains the matrix $V_n = \tilde{H}_n^\dagger (\tilde{H}_n \tilde{H}_n^\dagger)^{-1} D_n$ where $D_n$ is a diagonal matrix which normalizes all columns of $\tilde{H}_n^\dagger (\tilde{H}_n \tilde{H}_n^\dagger)^{-1}$ to have unit norm. Then $V_{k,n}$ is obtained as the sub-matrix of $V_n$ formed by the $r_k^{(n)}$ columns corresponding to user k. Let $\xi(M^{(n)},n)$ denote the resulting weighted sum rate on the nth RB, where $$\xi(M^{(n)}, n) = \underbrace{\sum_{k=1}^{K} \sum_{i=1}^{M_r} \xi_{i,k}(M^{(n)}, n) \cdot \xi(M^{(n)}, n)}_{=\xi(M^{(n)},n)}$$

denotes the weighted rate obtained on the $i^{th}$ mode and nth RB for user k and is given by $$\xi_{i,k}(M^{(n)},n)=w_k \log(1+\rho_{k,n}\gamma_{i,k,n}), i:M_{i,k}^{(n)}=1 \quad (2)$$

With $\xi_{i,k}(M^{(n)},n)=0, i:M_{i,k}^{(n)}=0$. Here, $w_k$ denotes the weight of user k and $\gamma_{i,k,n}$ is the effective gain. This gain equals the squared norm of the component of the column in $\tilde{H}_n^\dagger$ corresponding to mode i of user k, in the orthogonal complement of the span of all other columns in $\tilde{H}_n^\dagger$.

Now consider any set of co-scheduled user $U^{(n)}$ along with a feasible rank vector $r^{(n)}$. The optimal weighted sum rate (under our ZF precoding convention) for this choice is given by $$\xi(U^{(n)}, r^{(n)}, n) = \max_{M \in \{0,1\}^{M_r \times K}: \sum_{i=1}^{M_r} M_{i,k} \infty r_k^{(n)}, \forall i} \xi(M, n)$$

Next, a first observation is stated. This observation has been formally proved for the case of single-stream per-user ZF precoding with full power optimization.

Lemma 1 Let $e_j$, $1 \leq j \leq K$ denote a basis vector of length K with its entry equal to one in its $j^{th}$ position and zero elsewhere. Then, $$\xi(U^{(n)}, r^{(n)}, n) \leq \sum_{k \in U^{(n)}} \xi(\{k\}, r_k^{(n)} e_k, n). \quad (3)$$

Yet another embodiment considers the MU-MIMO scheduling problem for a wideband system with N RBs to find the joint optimal user grouping, mode and RB allocations which maximize the weighted sum rate. The first main practical constraint that is imposed here is the per-user rank constraint, i.e., the rank assigned to a user should be identical on all its allocated RBs. Then, dimensioning constraints are incorporated which dictate that on any RB assigned to more than one user, no more than $l^{MU}$ users can be co-scheduled, no more than $l^{MU}$ layers can be assigned to any scheduled user and no more than $L^{MU}$ layers can be assigned across all scheduled users. Clearly, without loss of generality we can assume $l^{MU} \leq L^{MU}$. On the other hand, on any RB assigned to just one user, no more than l layers can be assigned to that user and we make a natural assumption that $1 \leq l^{MU} \leq l \leq M_r$.

Denote N as the set of RBs that are available for scheduling, where $N=\{1, \ldots, N\}$. The MU-MIMO scheduling problem is posed here as $$\max_{\{U^{(n)} \in U, r^{(n)}\}_{n \in N}} \sum_{n \in N} \xi(U^{(n)}, r^{(n)}, n), \quad (4)$$

$$\text{s.t.} |U^{(n)}| \geq 2 \Rightarrow \begin{cases} \sum_{k \in U^{(n)}} r_k^{(n)} \leq L^{MU} \\ \|r^{(n)}\|_\infty \leq l^{MU} \\ |U^{(n)}| \leq l^{MU} \end{cases}$$

$|U^{(n)}| = 1 \Rightarrow \|r^{(n)}\|_\infty \leq l$ $r_k^{(n)} = r_k^{(m)}$, if $k \in U^{(n)} \cap U^{(m)}$, $\forall n \neq m$.

$r_k^{(n)} = 0, \forall k \notin U^{(n)}$ & $r_k^{(n)} \geq 1, \forall k \in U^{(n)} \forall n$.

In LTE-A (LTE Rel. 10), $l^{MU}=L^{MU}=4$ and $l^{MU}=2$ but these can be significantly more relaxed for massive MIMO systems. The problem in (4) can be ascertained to be NP-hard in general since it subsumes simpler scheduling problems that are already known to be hard.

Consider the following scheduling problem on any RB n.

$$\max_{A \in U | A \leq l^{MU}, A} \{\xi(A, d, n)\} \quad (5)$$

$$\sum_{k \in A} d_k \leq L^{MU} \; \& \; 1\{k \in A\} \leq d_k \leq l^{MU} 1\{k \in A\},$$

$\forall k \in U, |A| \geq 2$ $1\{k \in A\} \leq d_k \leq l 1\{k \in A\}, \forall k \in U, |A| = 1,$ Where $1\{.\}$ denotes an indicator function that is one if the input argument is true and is zero otherwise. The special case where each user has one antenna and hence can be assigned at-most one layer has been recently considered and analyzed. The results are first extended to different choices of transmit power allocation and where each scheduled user can be assigned any arbitrarily fixed rank. Letting the rank fixed for user k (when scheduled) to be $r_k^*: 1 \leq r_k^* \leq l^{MU}$ we consider a simplified version on any RB n, $$\max_{A \in U} \{\xi(A, n)\} \quad (6)$$

$$|A| \leq l^{MU}, \sum_{k \in A} r_k^* \leq L^{MU},$$

it further adopts the convention that $\xi(A,n)=0$ whenever the ZF transmit precoder construction is not possible. Notice now that the objective function can be viewed as a normalized non-negative set function defined on all subsets on U, which outputs a real (non-negative) value for each possible input set. This function would also be a submodular set function provided $$\xi(A \cup \{u\}, n) - \xi(A, n) \geq \xi(B \cup \{u\}, n) - \xi(B, n),$$

$$\forall A \subseteq B \& u \in U \backslash B. \quad (7)$$

The proof is based on a counter-example that can be constructed.

The implication that simple greedy methods need not guarantee a constant-factor approximation even for the simpler problems. Nevertheless, since the exhaustive search is in general impractical, consider the Greedy Search to solve the problem. This greedy search is a natural adaptation that a simple performance bound can be asserted. At each stage of this greedy search, the gain is evaluated in weighted sum rate obtained by adding one mode to an existing user or to a new user (subject to feasibility constraints), and determine the best possible choice resulting in the largest gain in weighted sum rate. This choice is accepted if the gain is positive else the process terminates. For the final selection, the weighted sum rate of the output obtained upon termination is compared against the best single-user weighted rate and the selection corresponding to larger rate is chosen. Note that best single-user weighted rate, which is the optimal solution on the RB of interest under the restriction that it be assigned to only one user, can be readily determined (as detailed in the appendix). Then, since a selection at-least as good as the best single user choice is chosen and no more than $l^{MU}$ users can be co-scheduled, $1 \geq l^{MU}$ and invoke the property stated in (3) to deduce the following result. The greedy search yields a selection yielding a weighted sum rate that is at-least as large as $$\frac{1}{l^{MU}}$$

times the optimal objective value.

Still another embodiment presents and analyzes a rank balancing based scheduling algorithm that is applicable to any arbitrary input dimensioning parameters $L^{MU}$, $l^{MU}$, $l^{MU}$, $l^{SU}$. It is noted that a particular case of this algorithm that applies to $l^{MU}=2$, $l^{MU}=L^{MU}=4$. More importantly, in a post-processing stage enhancements are incorporated that are necessary for practical implementation such as speed-ups, finite constraints on buffers and finite MCSs and enhanced HARQ support. The detailed procedure is provided. The key steps of the proposed rank balancing method are the following.

Step(1) Greedy search without the per-user rank constraint: For each RB n, the weighted sum rate is optimized over user, mode selections, and determine the optimized user and mode choices $\tilde{U}^{(n)}$, $\tilde{M}^{(n)}$. Let $r^{(n)}$ denote the associated rank selection. $\tilde{M}$ Step(2) Fix the per-user rank through rank balancing: For each user k, we obtain $q_{k,m}$ which is its sum weighted rate over all RBs $n \in N$ with $\check{r}_k^{(n)}{}_k^{(n)}=m$, for each rank m. $q_{k,m}$ is added to certain weighted rate estimates from other RBs on which user k is assigned a rank larger that m in Step (1) to obtain $\check{q}_{k,m}$. Then, rank m* is found which results in the highest estimated weighted sum rate for user k and set $r_k^*=m^*$.

Step(3) Based on the determined user rank vector r*, user is refined, mode selections on each RB, where rank of each user is restricted in the considered user set to be its corresponding rank in r*. Note that on each RB n, the basic refinement begins by setting $\tilde{U}^{(n)}=\phi$, $\tilde{M}^{(n)}=0$. Then, for each user $k \in \tilde{U}^{(n)}: \check{r}_k^{(n)} \geq r_k^*$, k is added to $\tilde{U}^{(n)}$ and select for that user in $\tilde{M}^{(n)}$ the $r_k^*$ modes yielding the top $r_k^*$ largest elements from $\{\xi_{i,k}(\tilde{M}^{(n)},n)\}_{i=1}^{M_r}$. For any other user $k \in \tilde{U}^{(n)}: \check{r}_k^{(n)} \geq r_k^*$, no mode is selected and no user is added to $\tilde{U}^{(n)}$.

Note that Step (3) should not be applied to any RB $n: \check{r}_k^{(n)}=r_k^*$, $\forall k \in \tilde{U}^{(n)}$. Also, further refinement can be optionally done to improve $\xi(\tilde{M}^{(n)}, n)$ without changing the non-zero determined ranks in r*.

Initializations: $N=\{1, \ldots, N\}$, $U=\{1, \ldots, K\}$, and $r^*=0$. each $n \in N$ Optimize the weighted sum rate $\xi(M,n)$ over user, mode allocations A,M such that $\|M\|_1 \leq L^{MU}$ and $1\{k \in A\} \leq \sum_{i=1}^{M_r} M_{i,k} \leq l^{MU} 1\{k \in A\} \forall k$ where $2 \leq |A| \leq l^{MU}$, as well as over each singleton set $A=\{k\}$ with $\|M\|_1 \sum_{i=1}^{M_r} M_{i,k} \leq 1$. Denote the optimized allocations by $\{\tilde{U}^{(n)}, \tilde{M}^{(n)}\}$ and let $\check{r}^{(n)}$ be the corresponding optimized ranks. For each $k \in U_n \tilde{U}^{(n)}$ and each m Obtain $q_{k,m}=\sum_{n:\check{r}_k^{(n)}=m} \xi_k(\tilde{M}^{(n)},n)$. Set $\tilde{q}_{k,m}=q_{k,m}$. For each $n: \check{r}_k^{(n)}{}_k^{(n)}>m$, update $\tilde{q}_{k,m}=\tilde{q}_{k,m}+\Delta_{k,m}(\tilde{M}^{(n)},n)$, where $\Delta_{k,m}(\tilde{M}^{(n)},n)$ is the sum of the m largest elements from $\{\xi_{i,k}(\tilde{M}^{(n)},n)\}_{i=1}^{M_r}$. For each user $k \in U_n \tilde{U}^{(n)}$, find $r_k^*=\text{argmax}_m \tilde{q}_{k,m}$. Refine the user and mode selections on each RB $n \in N$, to obtain the optimized output.

The following theorem proves that this embodiment for MU-MIMO scheduling (rank balancing method) has a worst-case performance guarantee. We let $$H(j) = 1 + \frac{1}{2}, \ldots + \frac{1}{j}, \forall j \geq 1.$$

Theorem 1 This embodiment achieves $$\frac{1}{l^{MU} H(\ell)}$$

approximation to the MU-MIMO scheduling problem (4). Proof: First, the greedy search yields a selection yielding a weighted sum rate that is at-least as large as $$\frac{1}{l^{MU}}$$

times the optimal objective value to deduce that the weighted sum rate determined on each RB in Step (1) is at-least $$\frac{1}{l^{MU}}$$

times the optimal one for that RB. Thus, the weighted sum rate across all RBs is at-least $$\frac{1}{l^{MU}}$$

times the sum of the per-RB optimal weighted sum rates across all RBs. Since the latter sum ignores the per-user rank constraint it is clearly an upper bound to the optimal solution of the MU-MIMO scheduling problem (4). Next, the worst-case loss due to the rank balancing step is characterized and shows that the final solution from this embodiment is guaranteed to achieve $$\frac{1}{H(\ell)}$$

times the weighted sum rate across all RBs obtained after Step (1). Thus, the final output yields a weighted sum rate that is at-least $$\frac{1}{l^{MU}H(l)}$$

of the optimal solution of (4), thereby proving the theorem. Then note that the weighted rate for user k after Step (1) is $\Sigma_{m=1}^{l} q_{k,m}$, so that the overall weighted sum rate is $\Sigma_{k\in U} \Sigma_{m=1}^{l} q_{k,m}$. Further, by construction, we have that $$\tilde{q}_{k,r_k^*} \geq \max_{m=1}^{l} \left\{ q_{k,m} + \sum_{m'>m} \frac{m}{m'} q_{k,m'} \right\}.$$

Therefore, that ratio $$\frac{\tilde{q}_{k,r_k^*}}{\sum_{m=1}^{l} q_{k,m}}$$

is at-least $$\min_{x \in 1 R_m^l} \left\{ \frac{\max_{m=1}^{l} \left\{ x_m + \sum_{m'>m} \frac{m}{m'} x_{m'} \right\}}{\sum_{m=1}^{l} x_m} \right\}. \quad (8)$$

The solution to the problem in (8) can be determined using a general result, as $$\frac{1}{1^T G^{-1} 1} \quad (9)$$

where G for us is an l×l lower triangular matrix which has entries $$G_{i,j} = \frac{j}{i}, \forall i \geq j.$$

Thus $G^{-1}$ is a bidiagonal lower triangular matrix with $$G_{i,i} = 1 \forall i \ \& \ G_{i,i-1} = \frac{-(i-1)}{i}, \forall i \geq 2.$$

Thus, we have that $$\frac{1}{1^T G^{-1} 1} = \frac{1}{H(l)}. \quad (10)$$

Notice then, that the basic refinement step obtains $\tilde{U}^{(n)}$, $\tilde{M}^{(n)}$. It can be seen that since on each RB and for each user scheduled on that RB after Step (1), we retain only a subset of the assigned modes, we will have $\Sigma_{n\in N}\xi_k(\tilde{M}^{(n)},n) \geq q_{k,r_k^*}$, $\forall k$. Since further refinement will only improve the solution at hand, we have the desired result.

In order to use the rank balancing proposed above for LTE scheduling we need to incorporate finite MCS, finite buffers and HARQ. The related enhancements are described that form the post-processing stage. This stage begins after the output from rank balancing has been obtained. The enhancements can be done in embodiments individually or in embodiments together as combinations. The enhancements when employed in an LTE system increase the efficiency of the system by better managing the user requests on the system for an optimized use of the available bandwidth by reducing the need for re-transmission of data to the user, efficiently handling re-transmission of the user, aligning a user's data usage across all RBs, or aligning a user's ranking across all RBs.

Finite MCS and Finite Buffers:

The MU-MIMO scheduling output is used and users are processed in a sequential manner. In one embodiment, the processing order is obtained by sorting the weighted sum rates of the users across all RBs in the descending order. For each user under consideration, the rank determined by the algorithm is used and all RBs on which it is scheduled are collected. Note that the assigned rank determines the codeword to layer mapping. The collected RBs are sorted in the descending order of the weighted rates achieved on those RBs by the user of interest. Then it determines and assigns a subset of the top RBs from the sorted set. This subset is determined by maximizing the rate achieved with the available finite MCS and under the finite buffer constraint. The top RBs are considered from a sorted subset, the complexity of determining the subset scales only linearly in the number of RBs N. The remaining RBs not in the subset (if any) are vacated by the user. For each such RB, in case any of the other co-scheduled users have not yet been processed, the further refinement step can be repeated, albeit using the pool of only un-processed users. Otherwise, if at-least one processed user has been assigned that RB, the signal-to-interference-plus-noise ratios (SINRs) of other un-processed co-scheduled users are re-computed since they would have improved.

Speed-Ups:

Additional restrictions are imposed in order to reduce complexity or additional conditions are checked when optimizing the narrowband problem on each RB n. These include:

Imposing a rank restriction that for any user set $A \subseteq U$: $|A| \geq 2$, a permissible rank vector must satisfy $\|d\|_\infty \leq 1$, but $\|d\|_\infty \leq l$ when $|A|=1$. In other words, SU assignments are searched for with ranks up to l but restrict MU assignments to co-scheduling users with ranks identical to 1. Such a restriction is also beneficial in terms of mitigating the impact of imperfect CSI. Another example is where the rank of some user k is fixed to a given input. Such a restriction is useful to handle re-transmission users, as described below.

Enforcing that the modes for any user can only be assigned in a fixed per-determined order (for instance the one corresponding to the descending order of respective singular values). Further, rank balancing procedure can be done using only $\check{q}_{k,m} = q_{k,m}$, $\forall k, m$ without the update in step-8 and the basic refinement can be simplified accordingly. It can be shown that the resulting approximation factor degrades to $$\frac{1}{l^{MU}l},$$

which is acceptable for small l.

Further complexity reduction can be obtained by reducing the number of precoder computations (without any performance degradation) as follows. Check whether the inclusion of a new user or layer meets a necessary condition for improving the weighted sum rate and initiate the precoder computation only upon passing the condition check. The following three progressively tighter necessary conditions are evaluated:

(A) Imposing a basic condition which computes an upper bound on the weighted sum rate assuming that any candidate user: (i) will see no interference from already selected ones (so we can use its single user reported CSI) and (ii) in turn will cause no interference to those already selected so that we re-use the SINRs that have been computed for such users. Accounting for power splitting between the candidate user and those already selected when computing the upper bound.

(B) The second tighter necessary condition exploits the fact that the effective channel gain seen by any candidate user decreases as the interfering set of already selected users grows. The most-recently computed SINRs can be used for any candidate. These would have been computed in a previous iteration when that candidate user passed the condition check but was not the best user in that iteration and hence was not selected.

(C) The third condition which is further tighter, exploits property stated in (B) for the already selected users as well. Instead of assuming that the already selected users see no interference from the candidate user, for each already selected user we use the minimum among the SINR computed in the previous iteration upon adding that candidate user and the SINR computed in the previous iteration upon adding the user selected as best user in that iteration. The cost of computing the enhanced upper bound used in this tighter condition is almost the same as that in the basic one since we are re-using the terms that are anyway computed.

HARQ:

The key feature it uses is to schedule re-transmission users by first including them in a common pool along with first transmission users. Then, for this common pool the scheduling output is obtained, with the restriction that the assigned rank of each re-transmission user must be the same as the one used for its first transmission. Next, in the post-processing stage while processing a re-transmission user it further limits its top RBs subset size to not exceed the number of RBs assigned to it in its first transmission.

Figure 1:
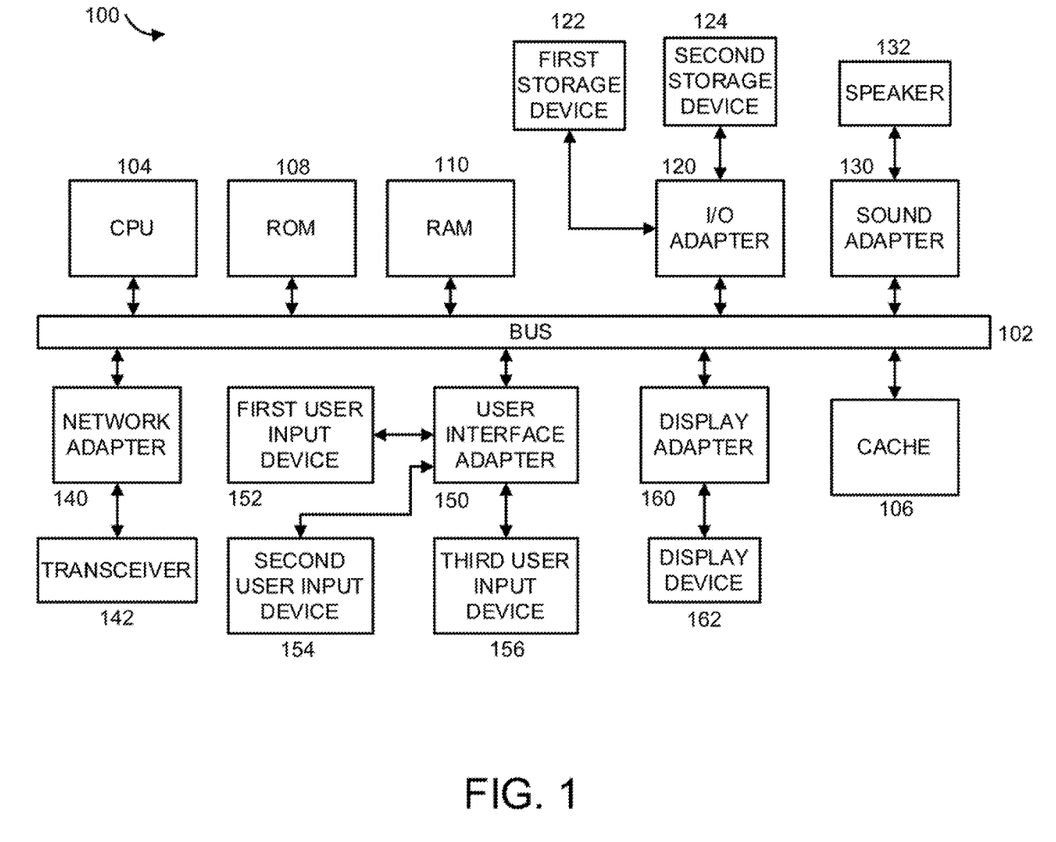
FIG. 1 shows a block diagram of an exemplary processing system to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read-Only Memory (ROM) 108, a Random-Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. The speaker 132 can be used to provide an audible alarm or some other indication relating to resilient battery charging in accordance with the present invention. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
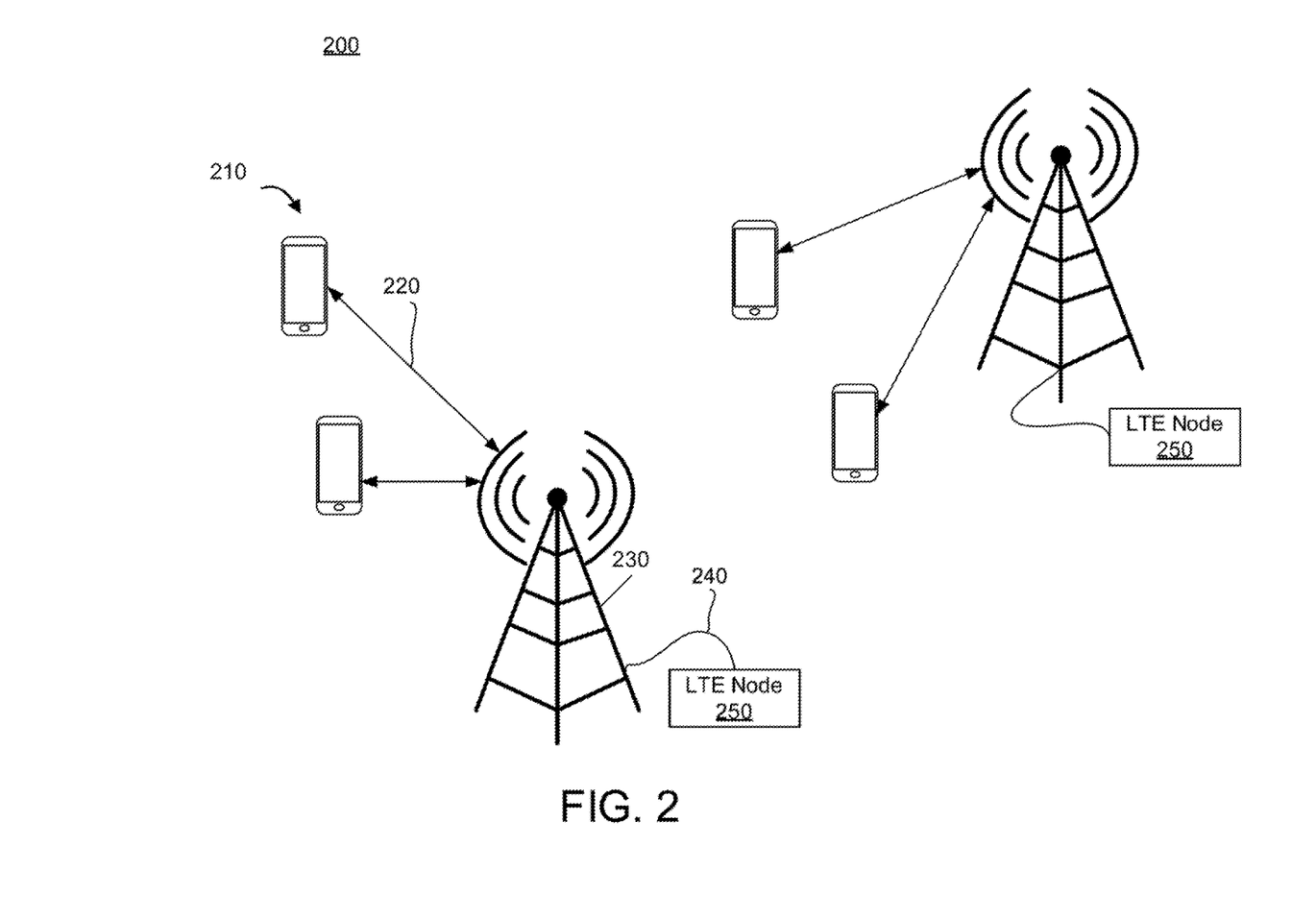
FIG. 2 shows a block diagram of an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
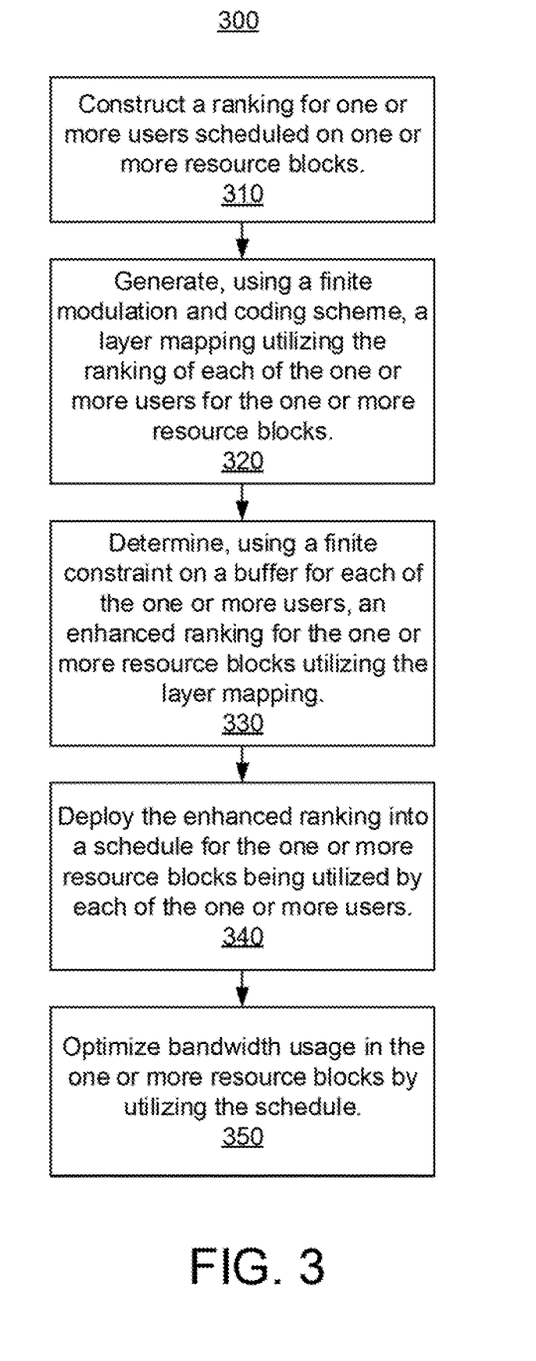
FIG. 3 is a block diagram illustrating a method for enhanced scheduling on an LTE network, in accordance with an embodiment of the present invention.
Figure 4:
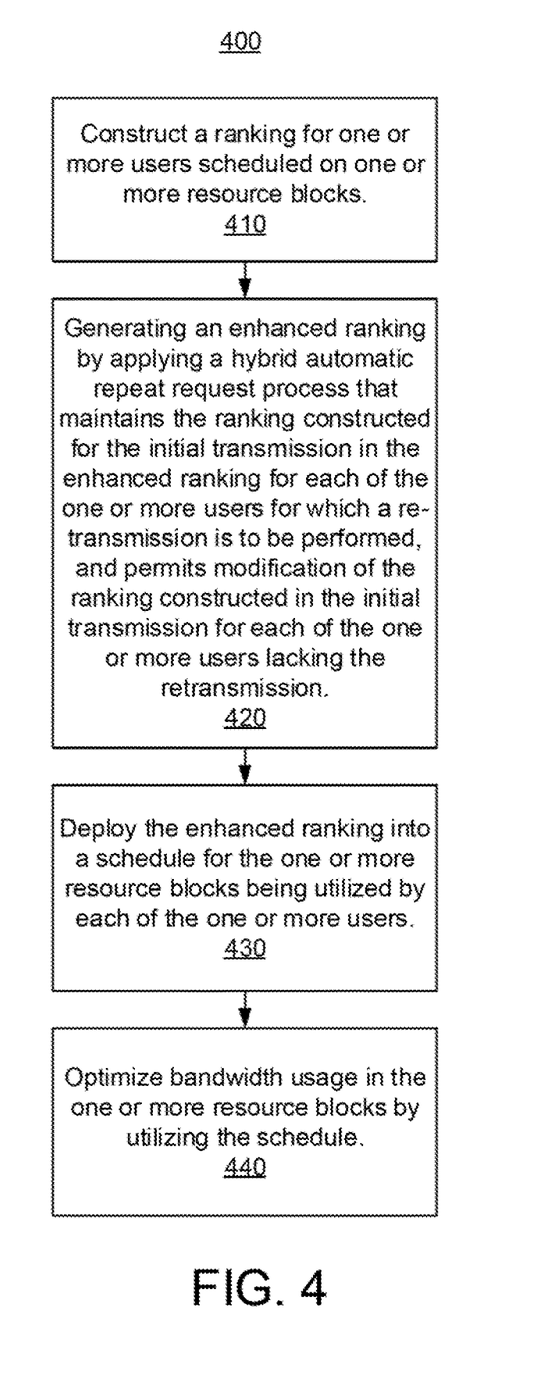
FIG. 4 is a block diagram illustrating another method for enhanced scheduling on an LTE network, in accordance with an embodiment of the present invention.
Figure 5:
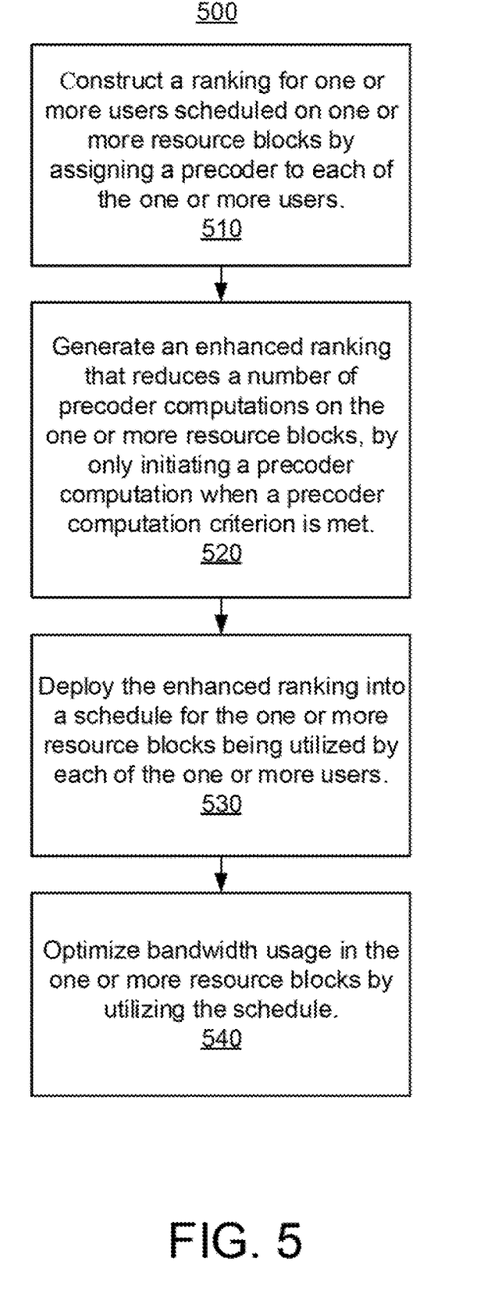
FIG. 5 is a block diagram illustrating yet another method for enhanced scheduling on an LTE network, in accordance with an embodiment of the present invention.

Further, it is to be appreciated that processing system 100 may perform at least part of the method described herein including, for example, at least part of method 300 of FIG. 3 and/or at least part of method 400 of FIG. 4 and/or at least part of method 500 of FIG. 5.

FIG. 2 shows an exemplary environment 200 to which the present invention can be applied, in accordance with an embodiment of the present invention. The environment 200 is representative of a cellular network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 may include a user equipment (UE) 210. In one embodiment, the UE 210 may be a cellphone. In another embodiment, the UE 210 may be a tablet, laptop, or other device that can use a wireless connection. The UE 210 may send data and information over a communication link 220. The communication link 220 may include a cellular based or a WIFI based link. The UE 210 is communicating with a cellular tower 230. The information or data sent from the UE 210 to the cellular tower 230 is transmitted by another communication link 240 to an LTE node 250.

Referring to FIG. 3, a block diagram illustrating an enhanced scheduling method 300 for an LTE network, in accordance with an embodiment of the present invention. An example of embodiment (i) from above: processing the output to enforce finite modulation and coding scheme (MCS) and finite buffer constraints. In block 310, construct a ranking for one or more users scheduled on one or more resource blocks. The ranking is assigning a transmit rank (or the number or streams or layers) for that user. In block 320, generate, using a finite modulation and coding scheme, a layer mapping utilizing the ranking of each of the one or more users for the one or more resource blocks. In block 330, determine, using a finite constraint on a buffer for each of the one or more users, an enhanced ranking for the one or more resource blocks utilizing the layer mapping. In block 340, deploy the enhanced ranking into a schedule for the one or more resource blocks being utilized by each of the one or more users. In block 350, optimize bandwidth usage in the one or more resource blocks by utilizing the schedule.

Referring to FIG. 4, a block diagram illustrating an enhanced scheduling method 400 for an LTE network, in accordance with an embodiment of the present invention. An example of embodiment (ii) from above: incorporating hybrid automatic repeat request (HARQ). In block 410, construct a ranking for one or more users scheduled on one or more resource blocks. In block 420, generating an enhanced ranking by applying a hybrid automatic repeat request process that maintains the ranking constructed for the initial transmission in the enhanced ranking for each of the one or more users for which a re-transmission is to be performed, and permits modification of the ranking constructed in the initial transmission for each of the one or more users lacking the retransmission. In block 430, deploy the enhanced ranking into a schedule for the one or more resource blocks being utilized by each of the one or more users. In block 440, optimize bandwidth usage in the one or more resource blocks by utilizing the schedule.

Referring to FIG. 5, a block diagram illustrating an enhanced scheduling method 500 for an LTE network, in accordance with an embodiment of the present invention. An example of embodiment (iii) from above: including complexity reduction features that also exploit the decorrelating property of massive MIMO systems. In block 510, construct a ranking for one or more users scheduled on one or more resource blocks by assigning a precoder to each of the one or more users. In block 520, generate an enhanced ranking that reduces a number of precoder computations on the one or more resource blocks, by only initiating a precoder computation when a precoder computation criterion is met. In block 530, deploy the enhanced ranking into a schedule for the one or more resource blocks being utilized by each of the one or more users. In block 540, optimize bandwidth usage in the one or more resource blocks by utilizing the schedule.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for enhanced scheduling on a long-term evolution network, the method comprising:
    constructing, by a processor, a ranking for one or more users scheduled on one or more resource blocks;
    generating, by the processor using a finite modulation and coding scheme, a layer mapping utilizing the ranking of each of the one or more users for the one or more resource blocks;
    determining, by the processor using a finite constraint on a buffer for each of the one or more users, an enhanced ranking for the one or more resource blocks utilizing the layer mapping;
    deploying, by the processor, the enhanced ranking into a schedule for the one or more resource blocks being utilized by each of the one or more users; and
    optimizing, by the processor, bandwidth usage in the one or more resource blocks by utilizing the schedule,
    wherein said generating step processes each of the one or more users in a descending sequential order according to the ranking of each of the one or more users, by sorting weighted sum rates of each of the one or more users across all of the one or more resource blocks.

2. The computer-implemented method of claim 1, wherein said constructing step includes ranking each of the one or more users on each of the one or more resource blocks and balancing the ranking for each of the one or more users across the one or more resource blocks to provide a balanced ranking.

3. The computer-implemented method of claim 1, wherein said sorting step sorts the one or more resource blocks into a subset, with any of the one or more resource blocks that are absent from the subset being removed from consideration for use by the one or more users.

4. The computer-implemented method of claim 1, wherein the layer mapping includes all of the one or more resources blocks that each of the one or more users is scheduled to utilize.

5. A non-transitory article of manufacture tangibly embodying a computer readable program which when executed causes a computer to perform the steps of claim 1.

6. A computer-implemented method for enhanced scheduling on a long-term evolution network, the method comprising:
    constructing, by a processor, a ranking for one or more users scheduled on one or more resource blocks;
    generating, by the processor using a finite modulation and coding scheme, a layer mapping utilizing the ranking of each of the one or more users for the one or more resource blocks;
    determining, by the processor using a finite constraint on a buffer for each of the one or more users, an enhanced ranking for the one or more resource blocks utilizing the layer mapping;
    deploying, by the processor, the enhanced ranking into a schedule for the one or more resource blocks being utilized by each of the one or more users; and
    optimizing, by the processor, bandwidth usage in the one or more resource blocks by utilizing the schedule,
    wherein said determining step includes utilizing a signal-to-interference-plus-noise ratio for each of the one or more users in the layer mapping, and
    wherein said utilizing step includes re-computing the signal-to-interference-plus-noise ratio for the one or more users absent from the layer mapping.

* * * * *